ically analyzers. The modification comprises reaction of some of the carboxy groups attached to the polypeptide with (i) a amide bond forming agent, e.g. 1-pyrrolidinylcarbonylpyridinium chloride, and (ii) a di- or triamine, such as piperazine, diethylenetriamine or ethylenediamine. Such modification enables that colloid to react faster with a gelatin hardener such as bis(vinylsulfonyl)methane (BVSM). When coated over an equal amount of unmodified gelatin, and both layers imbibed with BVSM, a modified gelatin layer showed an enzyme resistance greater than that of the unmodified gelatin. This demonstrates that the modified gelatin hardened preferentially. This discovery of a method for differential hardening can be utilized to prepare multilayer photographic elements or multilayer reagents for chemical analyzers that contain one or more layers which are hardened preferentially, i.e. to a greater degree than other layers.

United States Patent [19]

Specht et al.

[11] Patent Number: 5,219,992

[45] Date of Patent: Jun. 15, 1993

[54] MODIFICATION OF GELATIN

[75] Inventors: Donald P. Specht; Kenneth G. Harbison, both of Rochester, N.Y.

[73] Assignee: Eastman Kodak Company, Rochester, N.Y.

[21] Appl. No.: 540,424

[22] Filed: Jun. 18, 1990

[51] Int. Cl.$^5$ .................... G03C 1/30; C07C 147/04
[52] U.S. Cl. .................................................. 530/354
[58] Field of Search ........................................ 530/354

[56] References Cited

U.S. PATENT DOCUMENTS 3,490,911  1/1970  Burness et al. ...................... 530/354
3,539,644  11/1970  Burness et al. .
4,238,480  12/1980  Sawyer .
4,863,841  9/1989  Okamura et al. .

Primary Examiner—Merrell C. Cashion, Jr.
Assistant Examiner—P. Lynn Touzeau
Attorney, Agent, or Firm—Edith A. Rice

[57] ABSTRACT

Hydrophilic organic colloids such as collagen or gelatin are modified for use in photographic elements such as film or paper, or for use as reagents in automated dry chem- 7 Claims, No Drawings

MODIFICATION OF GELATIN

FIELD OF THE INVENTION

This invention pertains to an article such as a photographic element having more than one layer comprising a hydrophilic polypeptide such as gelatin. More specifically, it relates to such articles in which the gelatins in a least two layers have different reactivities toward a gelatin hardener. Still more specifically, one of the layers comprises a modified gelatin, and another layer an unmodified gelatin, such as the gelatin from which the modified material was prepared. The invention also pertains to a method for modifying gelatin, and to another method for preferentially hardening one gelatin-containing layer in a multilayer photographic element, e.g. film or paper.

This invention is extendable to the use of polypeptides other than gelatin, e.g. collagen. However, the use of gelatin or a modified gelatin is preferred.

BACKGROUND OF THE INVENTION

In the manufacture of photographic films and papers, a support is commonly coated with multiple layers. The different layers have different individual functions in the final product, and in many instances it is necessary that the layers remain distinct and not mix with one another. For example, a simple color photographic film can have a subcoating, a blue-sensitive layer, a green-sensitive layer, a red-sensitive layer, one or more color filtering coatings, etc. Films with about 15 layers have been described, e.g. in EP 257,515.

In forming photographic elements, the layers can be applied to the support by various procedures known in the art. For example, the layers can be applied by dip coating, roller coating, spray coating, bead coating, and the like.

Two or more layers can be simultaneously applied as illustrated by U.S. Pat. Nos. 2,761,791, 3,508,847, 3,539,644, and such other patents cited in *Research Disclosure* No. 308, December 1989, pp. 1007-8. There, coating and drying procedures are discussed.

It is well known that gelatin is a common matrix for multiple layer products of the type discussed above. Over the past recent decades, simplifications in photographic processing have been made through the use of higher solution temperatures, and the combination or elimination of one or more steps in the process. The application of hardeners to photographic gelatin and advances in hardener technology have made many such improvements possible.

The hardening of gelatin is a crosslinking process. It produces (i) a reduction of swelling in water and aqueous systems, and (ii) an increase in the temperature required for solution in water. Various materials have been suggested for hardening proteinaceous colloids like collagen or gelatin. For references relating to suggested hardeners, reference is made to *Research Disclosure*, supra, pages 1004-1005.

This invention comprises a modification of gelatin or similar polypeptide that makes it react much faster with a hardener. The modification process involves reaction of some of the —COOH groups attached to the polypeptide(s) with (i) an amide bond forming agent, and (ii) an amine having two or more amino groups. In the method of this invention, only some of the carboxy groups along the peptide chains of the starting colloid are reacted.

The reaction of only a partial number of the —COOH groups with the selected reagents to prepare photographically suitable gelatins is unknown in the art. In U.S. Pat. No. 4,238,480, all of such groups are reacted to prepare a collagen or collagen-like substance with a more electropositive surface, which is used to control or terminate blood loss.

The process of this invention provides materials having unobvious, desirable properties useful in photographic arts and in other technological areas. Accordingly, the processes and the compositions provided by this invention are deemed to be significant advance in the art.

SUMMARY OF THE INVENTION

Gelatin or similar polypeptide can be modified by introduction of additional amino groups of greater reactivity than those of the lysines present initially. The resulting gelatins react more rapidly than ordinary gelatin with hardeners such as bis(vinylsulfonyl)methane (BVSM). As a consequence, when hardened in a multilayer structure, a layer containing these modified gelatins attains higher ultimate hardness than other layers containing ordinary gelatin.

In photographic systems, gelatin modified by the process of this invention can be used to produce higher hardness and to reduce swell of a given layer. With hardeners such as BVSM, the modified gelatin can be brought to a specific hardness in less time.

In the practice of this invention, gelatin or similar hydrophylic colloid is caused to react with an amide bond forming agent in the presence of a diamine or a triamine. The result is a conversion of some of the free carboxyl groups in the gelatin into the monoamide of the diamine or triamine thereby introducing an additional amino group. When the diamines or triamines have two carbon atoms between nitrogens, such as ethylenediamine or piperazine, the introduced amino group is more reactive toward hardeners than the amino group in amino acid moieties such as lysine.

DESCRIPTION OF PREFERRED EMBODIMENTS

In one embodiment, this invention provides a modified gelatin, said modified gelatin having the formula:

wherein Gel is a gelatin polypeptide,

is a carbonyl group from a free carboxyl group in aspartic acid or a glutamic acid moiety in said polypeptide, and G is

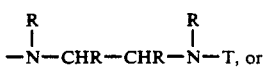

-continued

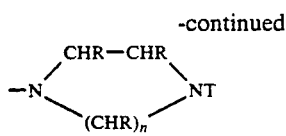

wherein each R is independently hydrogen or a primary or secondary alkyl group of one to about four carbon atoms, n is a positive integer having a value of one to about four, and T is hydrogen or

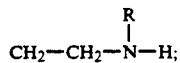

said modified gelatin being further characterized by having from 1% to about 40% of the free carboxyl groups in aspartic and glutamic acid moieties in said polypeptide being substituted with G-groups; whereby said modified gelatin has a rate of reaction with an activated olefinic hardener such as a bis(vinylsulfonyl) hardener which is faster than the reaction rate of said hardener with the corresponding unmodified gelatin not substituted with —G— groups.

In another embodiment, this invention provides a hardened gelatin prepared from the modified gelatin described above. Thus, this invention provides a hardened modified gelatin having the formula:

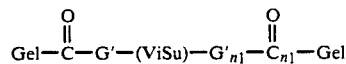

wherein Gel is a gelatin polypeptide,

is a carbonyl group from a free carboxyl group in aspartic acid or a glutamic acid moiety in said polypeptide, and G' is:

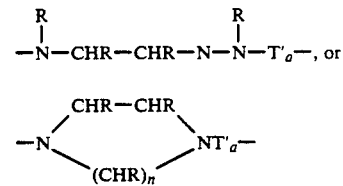

wherein each R is independently hydrogen or a primary or secondary alkyl group of one to about four carbon atoms, n is a positive integer having a value of one to about four, T' is

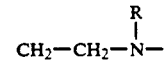

a is equal to zero or one, each n is an integer such that both are equal to zero or both equal to 1, and ViSu is the bridging group obtained from a vinyl sulfonyl hardener.

As can be seen, T' is a group derived by T after removal of a hydrogen.

In still another embodiment, this invention comprises a process for preparing a modified hardened gelatin,

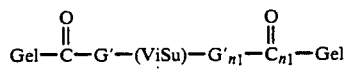

said process comprising reacting a modified gelatin

(described above) with a vinylsulfonyl hardener. The process can take place in the presence of non-modified gelatin. Generally speaking, when the hardening process is conducted with a mixture of modified and unmodified gelatin this process comprises formation of a mixture comprising some product in which the modified gelatin reacts with itself ($n_1$ is equal to 1) and with non-modified gelatin ($n_1$ is equal to 0). In the above formula, when $n_1$ is equal to 1, the composition was prepared from two molecules of gelatin modified according to this invention. When $n_1$ is zero, one molecule of modified gelatin and one molecule of unmodified gelatin are in the composition described by the formula. The unmodified gelatin is linked to the bis reactive olefin hardener via a nitrogen within the amino group in lysine or in another moiety along the polypeptide chain.

In another embodiment, this invention provides a multilayer element, such as a photographic element, or an element used in automated chemical analysis, said multilayer element having at least two gelatin layers, one layer comprising a modified hardened gelatin such as described above, and at least one other layer which is conventional gelatin hardened with a bis reactive olefin hardener such as a vinylsulfonyl hardener. The layers can contain other ingredients employed in the use intended.

As indicated above, one embodiment of this invention comprises reacting gelatin to prepare a modified gelatin which reacts faster with an active olefin hardener such as a vinylsulfonyl hardener. (This invention will be defined below in terms of this preferred embodiment involving gelatin; however, a skilled practitioner will recognize that this invention can be extended to the modification of other hydrophylic proteins such as collagen.)

The process of this invention comprises the reaction of certain substances (discussed below) with carboxyl groups in a polypeptide. The carboxyl groups which react according to the process of this invention are carboxyl groups which are not in the peptide bond in the polypeptide. For the purpose of this invention, such carboxyl groups are termed "free carboxyl groups." Such groups are present in natural polypeptides which contain aspartic or glutamic acid. It is a purpose of this invention to modify about 1% to about 40% of such carboxyl groups in gelatin. This modification occurs by treating a gelatin starting material with a sufficient quantity of (a) a modifying amine, and (b) an amide bond forming agent. In a preferred embodiment, this invention comprises admixing the gelatin to be modified (in an aqueous solvent) with a modifying diamine or triamine, then adding the amide bond forming agent to the mixture, and exposing the resultant reaction mass to reaction conditions. Above it was stated that about 1 to about 40% of the free carboxy groups in the polypeptide are modified according to this invention. There is some indication that the modification process utilized does not proceed to completion. Stated another way, it appears that not all of the amide bond forming agent available for reaction reacts to produce the modified gelatin. The extent of reaction is difficult to determine; it may be about 80%.

The modifying amine mentioned above has the characteristic group:

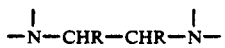

Preferably each R is hydrogen, but each R may be an alkyl group as defined above. As indicated by the formula, the modifying amine is a diamine, or a derivative thereof.

In the modifying amine, at least two amino nitrogens must be separated by a two carbon bridge. In triamines, it is preferred that all three amino nitrogens amino be separated by two carbons. Amines of this type may be acyclic or cyclic. Acyclic diamines of this type are illustrated by ethylenediamine, 1,2-diaminopropane, N-methylethylenediamine and N,N'-dimethylethylenediamine. Diethylenetriamine is another illustrative amine that can be employed. It illustrates the use of triamines such as

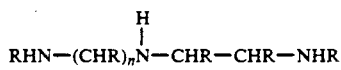

wherein R and n are as defined above.

The amine with the characteristic group need not be acyclic. thus, for example, the amine may be cyclic, as in piperazine or piperazine derivatives:

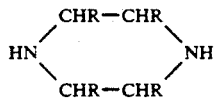

In such compounds, each R is preferably hydrogen; hence, piperazine is a preferred cyclic, modifying amine for use in this invention. One of the hydrogens in the piperazine nucleus may be substituted with a HNR—CHR—CHR— group. Thus, another preferred modifying amine is N-(2-aminoethyl)piperazine. Other cyclic diamines having at least one pair of ring nitrogens separated by a —CHR—CHR—bridge can be employed. The nitrogens may also be connected by a bridge of one to four carbons.

Preferred modifying amines have 2 to about 12 carbon atoms; more preferably 2 to 8 carbons. Preferably, the modifying amines can be added to the reaction mixture as a salt; more preferably a hydrohalide salt derived from HCl or HBr. Thus, for example, ethylenediamine can be added to the reaction mixture as the dihydrochloride,

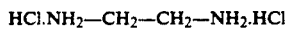

The modifying amine described above is generally employed in about two to about ten moles per each mole of amide bond forming agent. Somewhat more or less modifying amine can be employed. With triamines, a larger ratio, e.g. ten moles per mole of amide bond forming agent, is generally preferred.

The amide bond forming agent may also be known as a "quick acting hardener", or a "fast acting hardener" in the photographic chemical arts. A common feature of this type of agent is that a carboxy group is activated. When the reaction of such a hardener is conducted with gelatin and a modifying amine such as defined above, the reaction proceeds to form an amide bond with one of the amino groups in the diamine or triamine.

The amide forming agent for use in this invention can include, for example, carbodimides as reported in Erich Schmidt, Fritz Hitzles, Eberhard Lahde, *Berichte der Deutschen Chemischen Gesellshaft*, Vol. 71 II, p. 1933 (1938) and *Bull. Soc. Chem. France*, p. 1360 (1956); dihydroquinone compounds as described in German Patent Application (OLS) No. 2,322,317; carbomoylpyridinium compounds as in German Patent Application (OLS) Nos. 2,225,230, 2,317,677 and 2,439,551; carbamoyloxypyridinium compounds as described in German Patent Application (OLS) No. 2,408,814); and dication ethers as described in U.S. Pat. No. 4,877,724.

Such compounds are described and illustrated in U.S. Pat. No. 4,863,841; see especially column 11, line 63, to column 21, line 42. The description pertaining to such materials in U.S. Pat. No. 4,863,841, supra, is incorporated by reference herein as if fully set forth. Of these agents, certain are preferred. A class of preferred amide forming agents has the formula: n

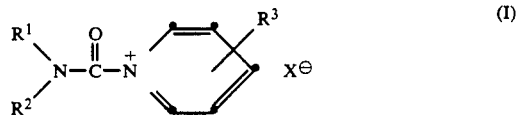

(I)

wherein $R^1$ and $R^2$ (which may be the same or different) each represents an alkyl group having from 1 to 10 carbon atoms (e.g., a methyl group, an ethyl group, a 2-3 ethylhexyl group, etc.) an aryl group having from 6 to 15 carbon atoms (e.g. a phenyl group, a naphthyl group, etc.), or an aralkyl group having from 7 to 15 carbon atoms (e.g., a benzyl group, a phenethyl group, etc.). Also, it is preferred that said $R^1$ and $R^2$ combine with each other to form a heterocyclic ring together with a nitrogen atom. Examples of forming a ring are a pyrrolidine ring, a piperazine ring, a morpholine ring, etc.

$R^3$ in formula (I) represents a substituent such as a hydrogen atom, a halogen atom, a carbamoyl group, a sulfo group, a ureido group, an alkoxy group having from 1 to 10 carbon atoms, an alkyl group having from 1 to 10 carbon atoms, etc. When $R^3$ is an alkoxy group or an alkyl group, these groups may be substituted by a substituent such as a halogen atom, a carbamoyl group, a sulfo group, or a ureido group.

$X^\ominus$ in formula (I) represent an anion and becomes a counter ion for the N-carbamoylpyridinium salt. When the amide forming agent of formula (I) forms an intramolecular salt, said $x^\ominus$ is not necessary. Examples of the anion represented by $x^\ominus$ are a halide ion, a sulfate ion, a sulfonate ion, $ClO_4^\ominus$, $BF_4^\ominus$, $PF_6^\ominus$, etc.

Another class of amide forming agents which may be used has Formula (II) as follows,

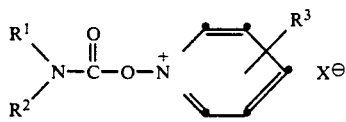 (II)

wherein $R^1$, $R^2$, $R^3$, and $x\ominus$ have the same meanings as defined for Formula (I).

Another class of amide bond forming agents which can be used in this invention has the formula

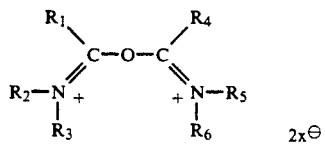

$R_1$ represents hydrogen, alkyl of 1 to 20 carbon atoms, aralkyl of 7 to 20 carbon atoms, aryl of 6 to 20 carbon atoms, $-YR_7$, the group

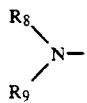

or the group

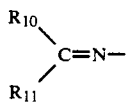

wherein Y represents sulfur or oxygen, and $R_7$, $R_8$, $R_9$, $R_{10}$, and $R_{11}$ each independently represents alkyl of 1 to 20 carbon atoms, aralkyl of 7 to 20 carbon atoms, aryl of 6 to 20 carbon atoms, or alkenyl of 2 to 20 carbon atoms or $R_8$ and $R_9$ together form a heterocyclic ring, or $R_{10}$ and $R_{11}$ are each independently hydrogen or together form a ring structure, or $R_1$ together with $R_2$ or $R_3$ forms a heterocyclic ring, $R_2$ and $R_3$ each independently represents alkyl of 1 to 20 carbon atoms, aralkyl of 7 to 20 carbon atoms, aryl of 6 to 20 carbon atoms, or alkenyl of 2 to 20 carbon atoms, or, taken together with $R_1$ or each other, forms a heterocyclic ring, $R_4$, $R_5$, and $R_6$ are defined as are $R_1$, $R_2$, and $R_3$ respectibely and are the same as or different from $R_1$, $R_2$, or $R_3$, and $x\ominus$ represents an anion or an anionic portion of the compound to form an intramolecular salt.

These compounds are described in U.S. Pat. No. 4,877,724, supra; the description thereof in that patent is incorporated by reference herein as if fully set forth.

Examples of amide bond forming agents useful in this invention are:

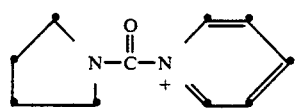 ABF-I

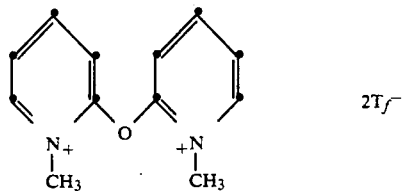 ABF-II

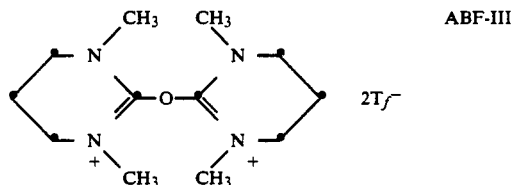 ABF-III

In the above formula $T_f$ stands for "triflate"; i.e. the trifluoromethanesulfonate anion, $CF_3SO_2O^-$.

Another preferred amide bond forming agent is 1-ethyl-3(3-dimethylamineopropyl)carbodimide hydrochloride.

It is believed that the formation of a modified gelatin of this invention by a N-carbamoylpyridinium salt proceeds by first forming a mixed anhydride which acylates an amine group in the modifying diamine or triamine to form an amide bond. The modifying diamine or triamine used in this invention are selected because they react more rapidly with the mixed anhydride than an amine group in gelatin.

The reaction of (a) the gelatin to be modified, (b) the amine (or amine salt) and (c) amide forming agent is conducted in an aqueous reaction medium preferably containing about 3 to about 20% by weight gelatin, and amide forming agent in an amount equivalent 1 to 40% of the free carboxy groups in the aspartic and glutamic acid moieties appearing along the polypeptide chains(s) in the gelatin being modified, and a diamine in an amount equivalent to 1.5 to 10 times the amount of moles of amide forming agent. The reaction is preferably conducted at ambient pressure at 40°-80° C., for 5 minutes to about 24 hours. Temperatures and times somewhat outside these ranges can be employed. The reaction should be conducted at an initial pH of from about 4 to about 7.

For any particular reaction within the broad process of this invention, the temperature(s) employed are selected to give a reasonable rate of reaction without an undue amount of unnecessary side reactions, e.g. hydrolysis. The reaction times are dependent on the reaction temperature and the inherent reactivity of the reactants selected.

After the modified gelatin of this invention is formed, it is chilled to a temperature of about 5° C., or such other temperature at which the modified gelatin sets. The resulting material is washed thoroughly with water to remove unreacted starting materials and by-products.

If desired, the pH of the modified gelatin can be adjusted prior to use and a preservative added to prevent degradation by biological organisms.

The modified gelatins produced as described above are more reactive toward active olefinic hardeners than unmodified gelatin. Such reactive olefin hardeners are described in U.S. Pat. Nos. 3,490,911, 3,539,644, 3,942,872 (Reissue 29,305), 3,640,720, 2,992,109 and German 872,153. In a more particular aspect, the modified gelatins of this invention are more reactive with vinylsulfonyl hardeners than unmodified gelatin.

Vinylsulfonyl hardeners are well known in the art. In general, they comprise two or more vinylsulfonyl groups liked to a bridging group. Such hardeners are exemplified by resorcinol bis(vinylsulfonate), bis(vinylsulfonyl)-m-xylene, bis(vinylsulfonyl) alkanes, alkylethers and amines, 1,3,5-tris(vinylsulfonyl)hexahydro-5-triazine, and the like. For this invention, bis(vinylsulfonyl)alkanes and ethers are preferred. The alkanes are illustrated by BVSM, bis(vinylsulfonyl)methane:

and the like, and bis(vinylsulfonyl)methyl ether

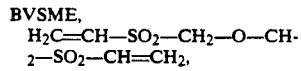

and the like. For such ethers and amines; reference is made to U.S. Pat. No. 3,539,644. The disclosure in that reference relating to vinylsulfonyl ethers and amines is incorporated by reference herein, as if fully set forth.

The vinylsulfonyl hardener, and/or other hardener to be reacted with the modified gelatin of this invention can be admixed with the modified gelatin, in accordance with the skill of the art. For example, the hardener may be added (a) to the melt containing the modified gelatin, (b) to another gelatin containing layer, (c) to a layer not containing gelatin, or alternatively can be applied in solution or as an overcoat to a previously dried multilayer element. If added to a gelatin or modified gelatin layer, the hardener is preferably added immediately prior to coating the material on which the gelatin layer is to be formed.

The concentrations at which the hardeners according to the invention are required to be used may vary within wide limits and depend mainly on the particular hardening compound used, and the hardness desired.

Satisfactory results are obtained with quantities of 0.1 to 10% by weight and preferably 0.5 to 3% by weight, based on the dry weight of gelatin.

Although the invention can be efficaciously conducted by use of a vinylsulfonyl hardener to harden the modified gelatin of this invention, it is to be understood that the invention can be conducted substituting one or more other hardeners for all or a portion of the vinylsulfonyl compound. The other hardeners may react with an amino or a carboxy group in the gelatin to be hardened. Examples of the latter type of hardener are set forth in U.S. Pat. No. 4,863,841, supra and in *Research Disclosure*, supra, pages 1004-1005.

The process and materials of this invention can be used for any photographic material using gelatin. For example, they can be used for color photographic materials such as color photographic negative films, color photographic reversal films, color photographic positive films, color photographic papers, color photographic reversal papers, and color photographic materials for a color diffusion transfer system and a silver dye bleach system, and for black-and-white photographic materials such as black-and-white photographic films, radiographic films, graphic films, black-and-white photographic papers, navigational photographic films, microfilms, facsimile films, photocomposing films or papers, graph films, etc.

Gelatin to which the process of this invention is applied may be so-called alkali-treated (limed) gelatin, which is immersed in an alkaline bath before the extraction of gelatin, acid-treated gelatin, which is immersed in an acid bath, double immersed gelatin which is treated with alkali and acid, or an enzyme-treated gelatin, i.e., gelatin which is partially hydrolyzed by heating in a water bath or by the action of proteolytic enzyme.

Also, gelatin to which this invention is applied may be, if necessary, partially replaced with colloidal albumin, casein, cellulose derivatives (e.g., carboxymethyl cellulose, hydroxyethyl cellulose, etc.), sugar derivatives (e.g., agar agar, sodium alginate, starch derivatives, etc.), and synthetic hydrophilic colloids (e.g., polyvinyl alcohol, poly-N-vinyl pyrrolidone, polyacrylic acid copolymers, polyacrylamide, and derivatives or partially hydrolyzed products thereof) as well as gelatin derivatives modified by the treatment of an amino group, an imino group, a hydroxy group, or a carboxy group contained in the gelatin molecule as a functional group with a reagent having one group capable of reacting the group, or a gelatin graft polymer prepared by bonding gelatin to the molecular chain of another polymeric material.

To prepare a multilayer element such as (i) a multilayer element used in an automated dry chemical analyzer as a substrate for reagents or (b) a multilayer photographic film or paper, this invention provides a process in which imbibition is used. For this process, a multilayer intermediate product is formed, having at least one layer with a modified gelatin of this invention, and another layer in which another gelatin is used. The other gelatin may be a gelatin which is not modified according to the process of this invention. The layers are coated on a substrate using any of the coating techniques mentioned above. After coating, a solution of the vinylsulfonyl hardener (or other hardener or hardeners used in the process) is applied to the outermost coat, and allowed to seep or become imbibed by the gelatin-containing layers. In this way, the gelatins in the layers react with the hardener and becomes hardened. Because the modified gelatin of this invention reacts at a faster rate with the hardener employed, it becomes harder than gelatin in the other layers.

PREPARATIVE EXAMPLE A

To a 12.5% solution of Type IV gelatin at 50° C. was added ethylenediamine dihydrochloride at 0.40 mol/kg dry gelatin. The pH was adjusted to 5.2 with HCl. To this was added with stirring 0.20 mol/kg dry gelatin of 1-pyrrolidinylcarbonyl pyridinium chloride. The mixture was stirred for 23 hr. at ca. 60° C., then was chilled and noodle-washed (104 cycles). The resulting modified gelatin was, melted, treated with Proxel GXL preservative, and its pH was adjusted to 5.78.

PREPARATIVE EXAMPLE B

Gelatin (12%, 667 g.) was treated with Proxel GXL preservative, stirred and heated at 50° C. Piperazine dihydrochloride monohydrate (2.66 g., 0.015 mole) was dissolved in the gelatin and the pH adjusted to 5.2. 1-Pyrrolidinecarbonylpyridinium chloride (1.70 g., 0.008 mole) was added and the reaction mixture heated at 50° C. for 22 hours. The resulting gelatin was chill-set, noodle-washed, treated with Proxel GXL and re-melted. The pH was adjusted to 5.77 before storage at 5° C.

The initial rate of viscosity increase for the modified gelatin of Preparative Example A was 2.17 times greater than that of the starting gelatin, when reacted with BVSM, measured at 0.12 mol/kg dry gelatin of BVSM, gelatin concentration 8%, temperature 40° C., and initial pH 5.78.

The rate is determined from the slope of the reciprocal of viscosity vs. time, measured after five minutes to allow for thermal and mechanical equilibration of the viscometer. Results are set forth as example 14 in the table below.

Coatings of modified gelatins containing 5 weight percent grey silver were prepared over an equal amount of unmodified gelatin and hardened with 0.10 mol/kg total gelatin of BVSM. Hardening was completed by incubation for 22 hours at 25° C., 80 percent relative humidity. When swollen in distilled water, the thickness of the modified gelatin layer from the gelatin Example A above was 93 percent of that of a coating of unmodified gelatin prepared in the same manner. The enzyme resistance of the modified gelatin layer from the gelatin of Example A was 3.6 times that of a coating of unmodified gelatin prepared in the same manner. The enzyme resistance was measured by gradually immersing the coating in a 0.8 weight percent aqueous solution of Takamine TM a proteolytic enzyme, at 25° C. at a rate of 0.2 im/min. The enzyme resistance was calculated as the ratio of the wedge lengths of the two layers, corrected for minor coverage differences. The wedge length of the upper layer is the length of the strip between the last part of the strip to contact the enzyme solution and the end of the layer containing the grey silver. The wedge length of the clear lower layer is the length between the end of the layer containing the grey silver and the pont where gelatin was completely removed from the strip. The clear lower gelatin layer was visualized by staining with methylene blue.

wherein Gel is a gelatin polypeptide,

is a carbonyl group from a free carboxyl group in aspartic acid or a glutamic acid moiety in said polypeptide, and G is

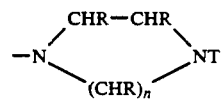

wherein each R is independently hydrogen or a primary or secondary alkyl group of one to about four carbon atoms, n is a positive integer having a value of one to about four, and T is hydrogen or

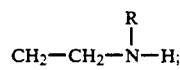

said modified gelatin being further characterized by having from 1% to about 40% of the free carboxyl groups in aspartic and glutamic acid moieties in said polypeptide being substituted with G-groups;

| | | Modified Gelatin Preparations | | | | |
|---|---|---|---|---|---|---|---|
| Example | Agent[1] | Amount[2] | Diamine | Ratio[3] | pH | Rate[4] | Hardness[5] |
| 1 | ABF-I | 16 | 1,3-propanediamine (comparison) | 2. | 5.0 | 1.08 | |
| 2 | " | 8 | piperazine | 2. | 5.2 | 6.82 | 4.36 |
| 3 | " | 16 | " | 3. | 5.0 | 17.30 | |
| 4 | " | 8 | 1-(2-aminoethyl)-piperazine | 10. | 5.2 | 2.70 | |
| 5 | " | 8 | diethylenetriamine | 10. | 5.2 | 5.14 | 3.25 |
| 6 | " | 2 | ethylenediamine | 2. | 5.2 | 1.15 | 1.12 |
| 7 | " | 4 | " | 2. | 5.2 | 1.32 | 1.51 |
| 8 | " | 8 | " | 1.5 | 5.2 | 1.58 | |
| 9 | " | 8 | " | 2. | 4.9 | 1.64 | 1.93 |
| 10 | " | 8 | " | 2. | 5.2 | 1.59 | 1.83 |
| 11 | " | 8 | " | 2. | 5.5 | 1.48 | 1.74 |
| 12 | " | 8 | " | 3. | 5.2 | 1.52 | 1.75 |
| 13 | " | 15 | " | 3.2 | 5.0 | 2.09 | |
| 14 | " | 16 | " | 1.9 | 5.0 | 2.17 | 3.60 |
| 15 | " | 16 | " | 3. | 5.0 | 1.74 | |
| 16 | " | 26 | " | 3.7 | 5.0 | 1.96 | |
| 17 | " | 8 | 1,2-propanediamine | 2. | 5.2 | | 1.66 |
| 18 | " | 16 | N-methylethylenediamine | 3. | 5.0 | 3.2 | |
| 19 | " | 16 | N,N'-dimethylethylenediamine | 3. | 5.0 | 2.8 | |
| 20 | ABF-II | 8 | ethylenediamine | 2. | 5.2 | | 2.01 |
| 21 | ABF-III | 8 | " | 2. | 5.2 | | 1.87 |
| 22 | CDI | 16 | " | 3. | 5.0 | 2.85 | |

[1]Type of amide bond forming agent used.
[2]Percentage of carboxy groups in gelatin sample theoretically converted to amide bonds by the amount of amide bond forming agent added.
[3]Moles of diamine or triamine per mole of amide bond forming agent.
[4]Rate of viscosity increase with BVSM. The rate with unmodified gelatin is taken as equal to 1.00.
[5]Relative enzyme resistance when coated over unmodified gelatin and hardened with BVSM. The enzyme resistance of unmodified gelatin is taken as equal to 1.0

We claim:

1. A modified gelatin suitable for use as an intermediate in the preparation of a hardened gelatin, said modified gelatin having the formula:

whereby said modified gelatin has a rate of reaction with a bis reactive olefin hardener which is faster than the reaction rate of said hardener with the corresponding unmodified gelatin not having substitution with —G— groups.

2. Modified gelatin of claim 1 wherein G is derived from piperazine by removal of one amino hydrogen.

3. Modified gelatin of claim 1 wherein G is derived from N-(2-aminoethyl)-piperazine by removal of one amino hydrogen.

4. Modified gelatin of claim 1 wherein G is derived from diethylenetriamine by removal of one amino hydrogen.

5. Modified gelatin of claim 1 wherein G is —HN—CH$_2$—CH$_2$—NH$_2$.

6. A hardened modified gelatin having the formula

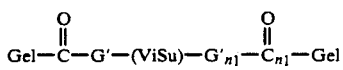

wherein each Gel is a gelatin polypeptide,

is a carbonyl group from a free carboxyl group in aspartic acid or a glutamic acid moiety in said polypeptide, and G' is:

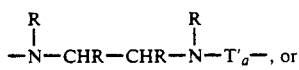

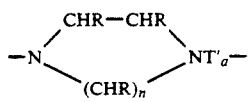

wherein each R is independently hydrogen or a primary or secondary alkyl group of one to about four carbon atoms, n is a positive integer having a value of one to about four, T' is

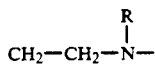

a is equal to zero or one, each n$_1$ is an integer such that both are equal to zero or both equal to 1, and ViSu is the bridging group obtained from a vinyl sulfonyl hardener; said modified gelatin being further characterized by having from 1% to about 40% of the free carboxyl groups in aspartic and glutamic acid moieties in said polypeptide being substituted with G'-groups.

7. A process for preparing a modified hardened

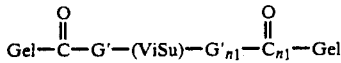

wherein Gel is a gelatin polypeptide, said process comprising reacting a vinylsulfonyl hardener with a modified gelatin having the formula:

wherein Gel is a gelatin polypeptide,

is a carbonyl group from a free carboxyl group in aspartic acid or a glutamic acid moiety in said polypeptide, and G is

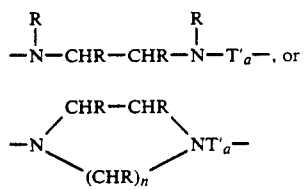

wherein each R is independently hydrogen or a primary or secondary alkyl group of one to about four carbon atoms, n is a positive integer having a value of one to about four, and T is hydrogen or

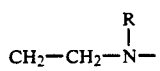

said modified gelatin being further characterized by having from 1% to about 40% of the free carboxyl groups in aspartic and glutamic acid moieties in said polypeptide being substituted with G'-groups.

* * * * *